United States Patent [19]
Puglia et al.

[11] Patent Number: 5,868,976
[45] Date of Patent: Feb. 9, 1999

[54] PROCESS OF MAKING A DIALYSIS MEMBRANE

[75] Inventors: John P. Puglia, Townsend; Ronald P. Brochu, Chelsea, both of Mass.

[73] Assignee: Koch Membrane Systems, Inc., Wilmington, Mass.

[21] Appl. No.: 818,392

[22] Filed: Mar. 14, 1997

[51] Int. Cl.$^6$ .............................. B29C 41/04; B29C 67/20
[52] U.S. Cl. .............................. 264/41; 264/310; 264/311
[58] Field of Search ................................ 264/41, 310, 311

[56] References Cited

U.S. PATENT DOCUMENTS

| | | |
|---|---|---|
| 3,451,951 | 6/1969 | Mizutani . |
| 4,536,240 | 8/1985 | Winn . |
| 5,049,253 | 9/1991 | Izuo et al. . |
| 5,352,345 | 10/1994 | Byszewski et al. . |
| 5,507,929 | 4/1996 | Brochu et al. . |

FOREIGN PATENT DOCUMENTS 375 290   6/1990   European Pat. Off. .

OTHER PUBLICATIONS

Patent abstracts of Japan, vol. 008, No. 184 (C–239), 23 Aug. 1984 & JP 59 078212 A (Daiichi Kogyo Seiyaku KK), 7 May 1984.

Brewer, Encyclopedia of Polymer Science & Engineering: Coatings, Electrodeposition, 2d. edition, 1985, vol. 3, pp. 675–687, New York.

Encyclopedia of Polymer Science & Engineering: Membranes, 2d. edition, 1985, vol. 9, pp. 541–546, New York.

*Primary Examiner*—Leo B. Tentoni
*Attorney, Agent, or Firm*—Shook, Hardy & Bacon L.L.P.

[57] ABSTRACT

A process for forming a dialysis membrane utilizing a mixture of ion exchange resin components and thermoplastic resin components mixed together in a dry state and rotationally formed into a membrane. The rotational forming process includes rotational molding using temperature to conform the components to the shape of the mold as well as rotational casting using solvents and phase inversion to form the membrane. The resulting membrane is a smooth, dimensionally stable, efficient dialysis membrane.

35 Claims, No Drawings

PROCESS OF MAKING A DIALYSIS MEMBRANE

BACKGROUND OF THE INVENTION

This invention relates in general to membranes suitable for use as dialysis membranes and, more particularly, to a unique process to fabricate dialysis membranes.

Dialysis membranes are used in a variety of applications to separate particular constituents from liquids. For example, such membranes have been used to remove salt from seawater, treat industrial waste, and to purify chemicals.

One use for dialysis membranes is in the removal of waste chemicals from electrodeposition processes. An electrodeposition process utilizes a tank or bath filled with an electrically-charged paint or coating. An electrically-conductive object to be coated is placed into the tank along with a separate electrode device and a source of electrical potential (voltage) is used to create a voltage difference between the object and the electrode. The charge on the coating causes it to be attracted to the object when the object is charged by the electrical potential, much like static electricity acts to pull articles of clothing together. A dialysis membrane is used as part of the electrode device to separate the electrode from the solution within the electrodeposition tank. A variety of such electrode devices are known, including those shown in U.S. Pat. Nos. 5,049,253 and 5,507,929, which are hereby incorporated herein by reference. As is shown in these patents, in these electrode devices the electrode is separated from the electrocoating solution by a dialysis membrane that generally surrounds the electrode. A space is provided between the membrane and the electrode for accumulation of neutralized waste which migrates through the membrane. Neutralized waste that passes through the membrane barrier is flushed from the area between the electrode and the membrane and removed from the process. Because of the configuration required for such electrodes, the membrane utilized needs to be generally self-supporting, non-fouling, easily cleaned and sealable between the electrode body and the membrane.

Dialysis membranes currently are produced utilizing a variety of methods, each with its own set of advantages and disadvantages. Some typical ways of manufacturing such membranes are described in U.S. Pat. No. 5,049,253, noted above. One method of producing a dialysis membrane involves impregnating a tubular polyethylene porous body or substrate with a monomer mixture liquid comprising a polymerizable monomer having a functional group suitable for introduction of an ion exchange group, which is then cross linked. Subsequently, an ion exchange group is introduced to create a working membrane. The ion exchange groups are thus deposited into the voids present in the porous body. One limitation of this method is that the effectiveness of the membrane is curbed by the relative proportion of ion exchange groups which can be deposited by this process. First, voids must be present in the substrate which can be filled by the ion exchange groups. Because of difficulties inherent in producing a stable substrate with a distribution of small voids, the relative number of voids is constrained. Second, the inefficiency inherent in depositing ion exchange media into the voids in the substrate further limits the portion of the ion exchange media present in the finished membrane. Thus, media formed by this method tend to be relatively inefficient. Moreover, in the process of making the substrate with voids and, subsequently, filling a portion of the voids with ion exchange media, the surfaces of the resulting membrane thus formed are relatively rough. In use, this roughness tends to allow collection of particles which produce fouling and further reductions in the efficiency of the membrane. For example, such fouling occurs in electrodeposition process due to collection of neutralized components and other accumulated debris resulting from the process coating the membrane. Surface roughness also can cause problems in sealing the membrane to the electrode or similar device. Moreover, the exterior roughness inhibits cleaning of the membrane and, ultimately, the useful life of the product. In addition, the porous membrane tends to swell and deform in use, creating sealing problems and leading to leaking and failures of the membranes in operation.

Another method of producing a dialysis membrane entails mixing ion exchange groups as a resin powder and a heat-moldable thermoplastic resin, such as an olefin resin, together in dry form. The mixed components are then extrusion molded into the requisite shape, typically a tubular shape. This extrusion method resolves to some extent the fouling problem associated with the previously described deposition process, because the extruded surfaces are generally smooth, and, also, resolves some of the limitations on the amount of ion exchange material which may be placed in a porous substrate as discussed above. However, the amount of olefinic resin required to make a mechanically resistant product reduces the amount of ion exchange material that can be used in the extrusion process. Also, the extrusion process stratifies the distribution of the ion exchange media in the finished dialysis membrane. This stratification limits the amount of ion exchange component which can take part in dialysis reactions, making the membrane more resistive to ion propagation. Thus, although a greater proportion of the ion exchange media is deposited in the membrane, this stratification inhibits the effectiveness and efficiency of the finished membrane. Moreover, the extrusion process limits the available membrane shapes to those commonly achievable from an extrusion process, and effectively prevents specialized shapes, such as creating textures on the ends of membranes in order to facilitate sealing.

SUMMARY OF THE INVENTION

It is therefore an object of the present invention to provide a dialysis membrane in which the amount of ion exchange material is maximized and the ion exchange material and thermoplastic support components are evenly commingled to maximize ion exchange efficiencies.

It is another object of the present invention to provide a dialysis membrane which is dimensionally stable in use to minimize deformation, degradation, and leaking of the membrane.

It is another object of this invention to enable production of an asymmetric membrane to maximize flow distribution and decrease fouling.

It is yet another object of the present invention to provide a dialysis membrane with substantially smooth exterior surfaces to minimize fouling in use with an electrode apparatus or the like.

It is a still further object of the present invention to provide a process for easily forming membranes in a variety of shapes and sizes to accommodate various potential use configurations. In one aspect, it is an object of this invention to enable texturing or configuring ends of membranes to facilitate sealing.

It is another object of the invention to provide a dialysis membrane with enhanced ion exchange efficiency.

To accomplish these and other related objects of the invention, the dialysis membrane of the present invention is formed utilizing a unique process in which the primary components, the ion exchange resin and thermoplastic resin, are mixed and rotationally formed, either by rotational casting or rotational molding, into the desired configuration. Rotational forming allows the components to be mixed in proportions designed to maximize the desired mechanical and ion exchange characteristics. The resulting membranes are substantially more dimensionally stable than prior art membranes because the present invention incurs minimal (0–1 percent) swelling in an aqueous stream. Moreover, rotational casting or rotational molding can produce smooth interior and exterior surfaces, reducing fouling characteristics and reducing the risk of passage of unwanted chemical by-products. Further, the casting technique allows a variety of shapes to be fabricated, allowing greater potential utility for the membranes. Rotational molding allows textured or threaded sections to be fabricated in the forming process. Rotational casting can be performed to produce an asymmetric membrane which is desirable in dialysis applications. The present invention membranes have been found to maintain a 10 percent to 50 percent higher ion exchange capacity than existing products with similar amounts of ionic components.

DESCRIPTION OF THE INVENTION AND PREFERRED EMBODIMENT(S)

The present invention is a process for forming a dialysis membrane and the resulting product. The process comprises the steps of mixing effective amounts of an ion exchange resin component and effective amounts of thermoplastic resin component, preferably in a dry state, and rotationally forming said mixed components. Rotational forming consists of either rotational molding or rotational casting. Both rotational molding and rotational casting effectively produce a homogeneous blend between the thermoplastic resin and ion exchange resin materials which is required for maximum dimensional stability and ion permeability.

Use of the term effective amounts, in reference to relative amounts of ion exchange resin and thermoplastic resin, indicates amounts of the two components sufficient to form a membrane which can effectively separate the chemical constituents desired to be separated and, also, to maintain desired mechanical characteristics of the membrane.

Rotational forming using rotational molding generally is comprised of inserting the mixed components into a forming chamber, rotating the chamber, and first heating the forming chamber to a temperature effective to cause the components to plasticize and form to the desired shape and then cooling the forming chamber while the chamber is rotating, and removing the formed dialysis membrane from the chamber.

In rotational molding the present invention membrane, ion exchange and thermoplastic resin constituents are mixed together in a dry state. The dry mixture is introduced into a rotational mold, which mold, while being rotated in one or more axes of rotation, is introduced into an oven and heated to the point of plasticity, typically from about 170° C. to about 225° C., with good results obtained at about 180° C. As the mold is rotated in the cavity, the dry mixture plasticizes and coats the inside of the mold. Once coating is accomplished, the mold is transferred to a cooling station where the mold and resulting formed part are cooled. The resulting cooled part is removed from the cavity. Good results are obtained using about 20 minutes per station with a rotational speed of from about 5 to about 20 RPM, using a nominal mold diameter of about 2 inches (5.1 cm). As will be obvious to one skilled in the art, other combinations of parameters will also produce acceptable results.

Rotational forming using casting techniques generally is comprised of the steps of mixing the material to be cast with an agent so as to form a homogeneous polymer solution, which polymer solution preferably has a pasty consistency, applying the polymer solution to a mandrel, and exposing the mandrel and material to conditions to resolidify the material.

In rotational casting the present invention, the membrane constituents, the ion exchange resin and thermoplastic resin, are blended in the desired proportions, and mixed with a solvent for those resins to form a polymer solution. The resulting polymer solution is cast upon a rotating textured mandrel to surface coat the mandrel to a desired thickness. The coated mandrel is then submerged in a liquid which is a nonsolvent for the resins, suitable to drive the solvent from the mixture, rendering a homogenous membrane structure. Insertion of the membrane into the nonsolvent produces a phase inversion which displaces the solvent. The removal of the solvent in this manner locks in the ion exchange beads and causes a fine micropore to be formed on the outside of the resulting membrane. The fine micropore structure provides a smooth surface which is resistant to fouling and the like and yet provides sufficient pore space for the ion product desired to be removed to pass through the membrane freely.

In one embodiment, the phase inversion step is performed as two steps wherein one surface of the plasticized material on the mandrel is contacted with the nonsolvent before the other, which produces an asymmetrical membrane. Preferably this is performed by first contacting the exterior surface with the nonsolvent. This produces a fine pore structure on the exterior of the membrane and stabilizes the membrane material. The stabilized membrane is removed from the mandrel and placed in the nonsolvent for a second time. The interior surface of the membrane thus formed is also phase inverted, but because a portion of the solvent has already passed through the interior surface, somewhat larger pores are formed on the interior surface of the membrane. This two-step phase inversion approach produces an asymmetrical membrane which has desirable properties well-known to those skilled in the art, including maximizing flow distribution across the membrane and decreasing fouling because of the relatively smooth exterior surface.

The polymer solution preferably is applied to the mandrel in a knife over roller process known in the art. This process comprises rotating the mandrel underneath a source of the polymer solution, forcing the polymer solution onto the mandrel, and rotating the mandrel with the polymer solution past a knife edge, which edge sets the desired thickness of the material by scraping off excess polymer solution. Other similar application processes known to one skilled in the art are equally acceptable, as long as a reasonably smooth application of the material to the mandrel is accomplished. As would be apparent to one skilled in the art, the desired thickness of the membrane depends upon the application, considering a variety of factors including structural rigidity and ionic permeability. Acceptable results have been obtained with membrane thickness from about 0.3 cm to about 0.6 cm (about ⅛ to about ¼ inches).

One embodiment of the rotational casting method includes utilizing a polypropylene net placed over the mandrel prior to application of the polymer solution. The net applied is what is commonly referred to in the art as "conwed" netting, which is a polypropylene net with holes nominally 3 mm across with net strands nominally 2 mm across allowing approximately 50 percent to 75 percent open area in the netting. This netting provides additional mechanical structure to the resulting membrane without impeding flow of chemical constituents through the membrane. In casting the membrane, the polymer solution is applied so as to fully envelop the netting, prior to the phase inversion step(s).

Although the various types of rotational forming produce similarly desirable results, the conditions of a particular application may indicate that a particular approach is more desirable. For example, because a portion of the mechanical structure is provided by the netting when it is utilized in rotational casting, the thermoplastic resin component of the polymer solution may be decreased, which allows a corresponding increase in the ion exchange component of the polymer solution applied in the process. Generally, this produces a membrane with comparatively higher ion exchange capabilities, but lower dimensional stability and mechanical characteristics. In comparison, rotational molding appears to produce the most homogeneous mixture of ion exchange and thermoplastic resins, producing the most dimensionally stable membranes, but with some reduction in ion exchange capacities.

It is of note that in neither rotational casting nor rotational molding is any significant pressure utilized to form the resulting membrane. The lack of pressure appears to facilitate a homogeneous blending of the thermoplastic resin and ion exchange resin, enhancing desired dimensional stability and ion exchange capabilities. Further, both the casting and molding techniques produce smooth surfaces on both sides of the membrane, resulting in reduced fouling characteristics.

Generally acceptable results have been obtained in forming the dialysis membrane of the present invention by mixing from about 2 percent to about 75 percent by weight ion exchange resin with from about 98 percent to about 25 percent by weight thermoplastic resin. Preferably, the membrane components comprise from about 10 percent to about 45 percent by weight ion exchange resin and from about 90 percent to about 55 percent by weight thermoplastic resin. More preferably, the membrane components comprise from about 15 percent to about 25 percent by weight ion exchange resin and from about 85 percent to about 75 percent by weight thermoplastic resin.

Generally, any composite ion exchange resin with either cationic or anionic characteristics is anticipated to provide acceptable results. Acceptable results have been obtained utilizing commercially available ion exchange beads typically formed by a chemical reaction of a charged monomer and a cross-linking monomer to result in a composite ion exchange resin bead. Such beads are a hydrophilic material capable of removing acids or bases, as desired, from aqueous solutions. For example, such ion exchange beads are commonly used in ion exchange columns. The particular kind of ion exchange resin utilized in the present invention is not particularly critical. It is expected that acceptable performance would be achieved with any number of commercially available ion exchange products. Very good results have been obtained with composite ion exchange beads available from Dow Chemical Co. of Midland, Mich., available under the trademark DOWEX®, such as DOWEX® acid ion exchange resin, having a microporous styrene/DVB matrix bead, 50 Wx8 with 200 or 400 mesh size resin which is spherical in shape using hydrogen as the ionic form, and DOWEX® strong base type 1 bead, 1×8 with 200 or 400 mesh size, having a microporous styrene/DVB matrix head structure spherical in shape using chloride as the ionic form. A preferred solvent for plasticising these resins in rotational casting is dimethyl formamide, although other solvents are suitable for various resins and are known to one skilled in the art.

As noted above, ion exchange resin alone is unsuitable for use as a material for a dialysis membrane that is required to hold a form. Ion exchange resin alone would swell and contract upon addition or removal of water, respectively, and, thus, are unsuitable for applications requiring a stable shape or structure to be maintained. Therefore, in the present invention, ion exchange resin is mixed with a thermoplastic resin prior to rotational molding or casting of the dialysis membrane. As commonly used in aqueous media applications, the thermoplastic resin in the present invention preferably is a hydrophilic polymer. Good results have been obtained with the thermoplastic resins polyvinyl alcohol, cellulose acetate, cellulose butyrate, cellulose propionate, and polyethylene-co-vinyl alcohol. Acceptable results are anticipated with various other hydrophilic polymers. For nonaqueous applications, hydrophobic polymers may be used for both the thermoplastic resin and the ion exchange resin. Preferably, the thermoplastic resin should have the characteristics of a melt flow profile consistent with the ion exchange medium, be a material possessing dielectric properties, and be a material compatible with the ion exchange beads.

A relatively wide range of mixtures of ionic exchange resin and thermoplastic resin is functionally acceptable in the present invention. One consideration for selecting the amount of ionic exchange resin is that a higher level of an ionic resin allows higher ionic permeability of the membrane. Thus, more constituents could be removed per unit area of membrane. However, with increasing percentage of ionic exchange resin, the amount of thermoplastic resin is decreased, decreasing the dimensional stability of the resulting membrane. Therefore, for example, when dimensional stability is a particular consideration, a lower percentage of ionic resin may be utilized to maintain the desired dimensional characteristics. Similarly, when a high flux rate is of critical importance, and dimensional stability is of lesser concern, the greater amount of ionic resin may be utilized to satisfy the particular use.

One embodiment of the present invention includes producing a membrane with both cationic and anionic characteristics rendering a bipolar membrane product. This is achieved through rotational molding or rotational casting. For either process, two mixtures of resin are made: a first mixture which includes the desired cationic or anionic resin along with a thermoplastic resin and a second mixture which has the other desired cationic or anionic component along with a thermoplastic resin. In rotational molding, the first mixture is placed directly into a rotational mold and the second mixture is first placed in a plastic bag made of polyethylene, or other plastic which melts at around 200° C., prior to placing it into the rotational mold. The mold is first brought up to an initial temperature sufficient to plasticize the resin, but not the plastic bag, about 180° C., at which temperature the first mixture coats the inside of the cavity. Subsequently, the temperature is raised to a temperature sufficient to melt the plastic bag, about 200° C. When the plastic bag melts, it releases the second mixture which then coats the interior of the mold and on top of the first mixture which has already coated the inside of the mold. In using rotational casting to create a bipolar membrane, the casting process basically is performed twice. First a complete membrane of the present invention is cast and stabilized as described above using the first resin mixture. Then the second mixture mixed with an appropriate solvent to form a polymer solution is cast upon the formed membrane and stabilized as described for the first casting layer, thus forming a bipolar membrane.

EXAMPLES AND COMPARATIVES

The following examples and comparatives further show the efficacy and utility of the present invention. It is not intended that these examples limit the scope of the present invention but, rather, the scope of the invention is defined by the claims appended to this specification.

Example 1—(Casting)

Dow Chemical Company (DOWEX®) 50 Wx8 200 mesh acid ion exchange beads of less than 5 percent relative humidity were mixed with dimethyl formamide in the presence of cellulose propionate. The proportions used were 37.5 gm dry weight of the DOWEX® to 300 gm of the dimethyl formamide along with 75 gm of cellulose propionate. The mixture was blended thoroughly to form a polymer solution after which the polymer solution was applied to a nominal 2.4 inch (6.1 cm) diameter cylindrical textured mandrel. The mandrel was rotated around its axis at about 50 rotations per minute. The mandrel remained spinning for approximately five minutes until the surface was effectively coated with the polymer solution. The mandrel was then submerged into water, as a nonsolvent. The mandrel was removed and the resultant product formed a dimensionally stable dialysis membrane with smooth surfaces. The membrane had desirable water absorbency and electrical resistance characteristics.

Example 2—(Molding)

A 37.5 gm dry weight (less than 5 percent relative humidity) portion of DOWEX® 50 Wx8 200 mesh ion exchange beads was added to 75 gm of cellulose propionate powder. The dry mixture was introduced into a mold cavity. The mold cavity was a cylinder, nominally 2.5 inches (6.35 cm) in diameter and 83 inches (210 cm) long. The mold was then rotated at nominally 20 rotations per minute in 3 axes of rotation. The rotating mold was moved into an oven where the mold was heated at about 180° C. at which temperature the material began to flow and coat the surface of the cavity. Once the cavity was coated, in about 15 minutes, the cavity was transferred to a cooling station maintained at ambient temperature where the mold and the part were cooled. Subsequently, the part was removed from the mold. The resulting molded part was a smooth surfaced, dimensionally stable ion exchange membrane.

Example 3 and Comparative

Sample membranes were prepared as in Example 1. For comparison, a commercially available membrane was obtained which had been prepared by impregnating a tubular polyethylene porous body with a monomer mixture liquid, as manufactured by Tokyama Soda Kabushiki Kaiska Co. of Yamaguchi, Japan.

Both types of membranes were inserted into commercially available sets of electrode apparatus for dialysis similar to those shown in U.S. Pat. No. 5,507,929. The test electrodes were inserted into 5-gallon (19 liter) tanks of acetic acid nominally 1 foot (30 cm) from a stainless steel cathode and a 110-volt DC potential was applied to both the present invention specimens and the comparatives. Equivalent flushing flow was established for both sets of test membranes so that the same voltage potential and chemical potential was present across all test membranes.

Direct current flow to the electrode apparatus at the fixed voltage of 110 DC was measured over time, as was the conductivity of the anolyte solution. Test results are shown in Table 1 below.

TABLE 1

| Time, Hours | Direct Current Flow, Amps | | Conductivity Micro-Ohms/Cm$^3$ | |
|---|---|---|---|---|
| | Present Invention | Comparative | Present Invention | Comparative |
| 0 | 1.3 | .7 | 1,000 | 970 |
| 1 | 2.0 | 1.5 | 875 | 850 |
| 2 | 2.5 | 2.2 | 800 | 780 |
| 3 | 2.6 | 2.5 | 775 | 750 |
| 4 | 2.7 | 2.7 | 770 | 745 |
| 5 | 2.7 | 2.7 | 765 | 740 |
| 6 | 2.7 | 2.8 | 760 | 735 |
| 7 | 2.7 | 2.8 | 760 | 730 |
| 8 | 2.7 | 2.8 | 755 | 730 |

This data shows that the present invention has significantly early higher ion exchange capability in critical early usage, and shows long-term comparability to existing membranes.

Example 4 and Comparative

As noted above, one use for the present invention membranes is in electrodeposition. Electrodeposition coating is particularly useful in the automotive industry where it is used to thoroughly coat automobile bodies to provide rust and corrosion protection needed for modern automobiles. Because of this use, tests were performed to determine the operational characteristics of the present invention membrane in use in an electrodeposition process.

In order to coat automobile bodies using electrodeposition, the bodies are submerged in a tank filled with a solution containing the coating in a liquid. As voltage is applied to the automobile body, the coating is attracted to the body. Electrodeposition process coats hard-to-reach areas, such as the hidden metal portions of an automobile body because, as the coating covers an object, it acts to electrically insulate the coated areas. As the coating process continues, charged coating particles are attracted to uncoated areas which remain electrically conductive and, thus, the charged coating particles migrate to these uncoated areas.

Commonly, the electrical potential required for electrodeposition is provided by multiple electrode-type devices in the coating solution and spaced around the object to be coated. A direct current (DC) voltage is then applied between the electrodes and the object to be coated to impose the required electrical potential for electrodeposition coating. The solution may contain a coating which either is positively or negatively charged, i.e., either a cationic or anionic, to be deposited onto an object.

In order to test the efficacy of the membranes in this service, test specimens were installed in an operating electrodeposition tank as described below. Sample membranes were prepared as described in Example 1.

The membranes prepared were formed into cylinders nominally 83 inches (2.1 meters) long, 2.5 inches (6.35 cm) in diameter, and 110–130 mils (0.28–0.33 cm) thick. These cylinders were each used with a standard submergible dialysis electrode apparatus, similar to that shown in U.S. Pat. No. 5,507,929.

For comparison purposes, the present invention membranes thus prepared were inserted into an electrodeposition tank as described below, along with commercially available comparative membrane-equipped electrodes. The comparative membranes were commercially available membranes prepared by impregnating a tubular polyethylene porous body with a monomer mixture liquid and were manufactured by Tokyama Soda Kabushiki Kaiska Co. of Yamaguchi, Japan. All conditions for the two sets of membranes were comparable.

The nominal tank size was nominally 80,000 gal. (300,000 liters) with ends sloped for entrance and exit of the automobile bodies. The tank was nominally 130 feet (40 meters) long, 8.2 feet (2.5 meters) wide, and 8.2 feet (2.5 meters) deep, with sloped ends. Electrode assemblies are arranged down each side of the tank, parallel to the path of automobile bodies traveling through the tank. Electrodes were placed 4 feet (1.2 meters) from the centerline of the tank, nominally 0.7 feet (0.2 meters) apart, so as to form a spaced relation to the automobile bodies as the bodies pass though the tank. Electrodes using the present invention membranes were installed along one side of the tank, parallel to the movement of automobiles, and the comparative electrodes were installed along the other side of the tank. Excess alkali or an acid neutralizer within the solution is removed from the tank through the membrane. Thus, the electrode device commonly utilized for these electrocoating or electrodeposition applications serves as both an electrode for the object which is to be coated or painted, and as a dialysis device for the removal of spent neutralizer waste from the solution.

In operation, automobile bodies pass through the tank attached to a conveyer system. Nominally, one automobile body per minute passes into the tank and has a ten minute retention time in the tank. Six automobile bodies are in the tank at any one time passing through the tank. Electrodes near the point of entry of the automobile bodies react more with the constituents of the tank than other electrodes because, as the automobile bodies pass through the tank and become covered with paint, the resistivity of the paint coating the bodies reduces further deposition of the paint. current (DC) power was supplied to the electrodes from a set of rectifier units which convert alternating current (AC) input to DC. Power input to the system was measured as alternating current supplied to these rectifier units. Data was extracted for each bank of units. Separate data was extracted for the first 20 percent of the units which carry a proportionately larger percentage of the current draw. The average current draw thus measured is shown in Table 2, below.

TABLE 2

Present Invention (PI) Rectifier Input Power Draw
Measured in Amps v. Comparative (Comp)

|  | All Units | | First 20% of Units | |
| --- | --- | --- | --- | --- |
|  | PI | Comp | PI | Comp |
| Day 1 | 420 | 520 | 150 | 190 |
| Day 3 | 395 | 495 | 165 | 180 |
| Day 5 | 400 | 495 | 170 | 190 |
| Day 7 | No Data | | | |
| Day 9 | 400 | 500 | 155 | 190 |
| Day 11 | 405 | 505 | 155 | 190 |
| Day 13 | 410 | 495 | 175 | 190 |
| Day 15 | 405 | *505 | 155 | 195 |

The results of this comparative show that a consistent 20–25 percent reduction in overall power consumption for equivalent removal of spent materials was achieved over the test period. The resulting paint coatings were within the required parameters for automotive electrodeposition coatings. The present invention was found to perform the required task with higher efficiency than presently available comparable membranes. Further, the present invention membranes exhibited greatly reduced buildup of waste product on the outer surfaces, indicating a reduced fouling tendency as compared to existing available membranes.

From the foregoing, it will be seen that this invention is one well adapted to attain all the ends and objects set forth, along with other advantages which are obvious or are inherent to the invention.

It is contemplated by and within the scope of the claims that certain features and sub-combinations are of utility and may be employed without reference to other features and sub-combinations.

Since many possible embodiments may be made of the invention without departing from its scope, the matters set forth in this application are to be interpreted as illustrative and not in a limiting sense.

We claim:

1. A process for forming a dialysis membrane comprising the steps of:

mixing together an ion exchange resin component and a thermoplastic resin component, in amounts effective to form a membrane which effectively separates the chemical constituents desired to be separated and, also, to maintain desired mechanical characteristics of the membrane; and rotationally forming said mixed components under conditions sufficient to form a dialysis membrane.

2. A process for forming a dialysis membrane as claimed in claim 1, wherein the rotational forming step comprises the steps of:

inserting said mixed components into a forming chamber;

heating said forming chamber while rotating said forming chamber to a temperature effective to cause said components to plasticize and conform to the shape of the forming chamber;

cooling said forming chamber; and removing the formed dialysis membrane from said chamber.

3. A process for forming a dialysis membrane as claimed in claim 2, wherein said ion exchange resin component is from about 2 percent to about 75 percent by weight and said thermoplastic resin component is from about 98 percent to about 25 percent by weight of the mix of said components.

4. A process for forming a dialysis membrane as claimed in claim 3, wherein the temperature of said forming chamber when heated is from about 170° C. to about 225° C.

5. A process for forming a dialysis membrane as claimed in claim 3, wherein said thermoplastic resin component is a hydrophilic polymer.

6. A process for forming a dialysis membrane as claimed in claim 3, wherein said thermoplastic resin component is a hydrophilic polymer selected from the group consisting of polyvinyl alcohol, cellulose acetate, cellulose butyrate, cellulose propionate, and polyethylene-co-vinyl alcohol.

7. A process for forming a dialysis membrane as claimed in claim 3, wherein said thermoplastic resin component is a hydrophobic polymer.

8. A process for forming a dialysis membrane as claimed in claim 2, wherein said ion exchange resin component is from about 10 percent to about 50 percent by weight, and said thermoplastic resin component is from about 90 percent to about 50 percent by weight.

9. A process for forming a dialysis membrane as claimed in claim 8, wherein the temperature of said forming chamber when heated is from about 170° C. to about 225° C.

10. A process for forming a dialysis membrane as claimed in claim 9, wherein said thermoplastic resin component is a hydrophilic polymer.

11. A process for forming a dialysis membrane as claimed in claim 9, wherein said thermoplastic resin component is a hydrophilic polymer selected from the group consisting of polyvinyl alcohol, cellulose acetate, cellulose butyrate, cellulose propionate, and polyethylene-co-vinyl alcohol.

12. A process for forming a dialysis membrane as claimed in claim 9, wherein said thermoplastic resin component is a hydrophobic polymer.

13. A process for forming a dialysis membrane as claimed in claim 2, wherein said ion exchange resin component is from about 15 percent to about 25 percent by weight, and said thermoplastic resin component is from about 85 percent to about 75 percent by weight.

14. A process for forming a dialysis membrane as claimed in claim 13, wherein the temperature of said forming chamber when heated is from about 170° C. to about 225° C.

15. A process for forming a dialysis membrane as claimed in claim 14, wherein said thermoplastic resin component is a hydrophilic polymer.

16. A process for forming a dialysis membrane as claimed in claim 14, wherein said thermoplastic resin component is a hydrophilic polymer selected from the group consisting of polyvinyl alcohol, cellulose acetate, cellulose butyrate, cellulose propionate, and polyethylene-co-vinyl alcohol.

17. A process for forming a dialysis membrane as claimed in claim 14, wherein said thermoplastic resin component is a hydrophobic polymer.

18. The process for forming a dialysis membrane as claimed in claim 1, wherein the rotational forming step comprises the steps of:
    mixing a solvent for said thermoplastic resin and ion exchange resin components with said components to form a polymer solution;
    applying said polymer solution to a rotating mandrel; and
    exposing said polymer solution to a liquid which is a nonsolvent for said thermoplastic resin and said ion exchange resin so as to cause phase inversion in the polymer solution and form a membrane.

19. A process for forming a dialysis membrane as claimed in claim 18, wherein said rotational forming step further comprises inserting a rigid polyethylene net over said mandrel prior to applying said polymer solution to said mandrel, said net having from about 50 percent to about 75 percent open space.

20. A process for forming a dialysis membrane as claimed in claim 18, wherein said ion exchange resin component is from about 2 percent to about 75 percent by weight and said thermoplastic resin component is about 98 percent to about 25 percent by weight of the mix of said components.

21. A process for forming a dialysis membrane as claimed in claim 20, wherein said thermoplastic resin component is a hydrophilic polymer.

22. A process for forming a dialysis membrane as claimed in claim 20, wherein said thermoplastic resin component is a hydrophilic polymer selected from the group consisting of polyvinyl alcohol, cellulose acetate, cellulose butyrate, cellulose propionate, and polyethylene-co-vinyl alcohol.

23. A process for forming a dialysis membrane as claimed in claim 20, wherein said thermoplastic resin component is a hydrophobic polymer.

24. A process for forming a dialysis membrane as claimed in claim 18, wherein said ion exchange resin component is from about 10 percent to about 50 percent by weight and said thermoplastic resin component is from about 90 percent to about 50 percent by weight of the mix of said components.

25. A process for forming a dialysis membrane as claimed in claim 24, wherein said thermoplastic resin component is a hydrophilic polymer.

26. A process for forming a dialysis membrane as claimed in claim 24, wherein said thermoplastic resin component is a hydrophilic polymer selected from the group consisting of polyvinyl alcohol, cellulose acetate, cellulose butyrate, cellulose propionate, and polyethylene-co-vinyl alcohol.

27. A process for forming a dialysis membrane as claimed in claim 24, wherein said thermoplastic resin component is a hydrophobic polymer.

28. A process for forming a dialysis membrane as claimed in claim 18, wherein said ion exchange resin component is from about 15 percent to about 25 percent by weight and said thermoplastic resin component is from about 85 percent to about 75 percent by weight of the mix of said components.

29. A process for forming a dialysis membrane as claimed in claim 28, wherein said thermoplastic resin component is a hydrophilic polymer.

30. A process for forming a dialysis membrane as claimed in claim 28, wherein said thermoplastic resin component is a hydrophilic polymer selected from the group consisting of polyvinyl alcohol, cellulose acetate, cellulose butyrate, cellulose propionate, and polyethylene-co-vinyl alcohol.

31. A process for forming a dialysis membrane as claimed in claim 28, wherein said thermoplastic resin component is a hydrophobic polymer.

32. A process for forming a dialysis membrane comprising the steps of:
    mixing together from about 15 percent to about 25 percent by weight of an ion exchange resin component with from about 85 percent to about 75 percent by weight of a thermoplastic resin component to form a homogenous mix, wherein said thermoplastic resin component is a hydrophilic polymer selected from the group consisting of polyvinyl alcohol, cellulose acetate, cellulose butyrate, cellulose propionate, and polyethylene-co-vinyl alcohol;
    rotationally forming said mixed components by:
        inserting said mixed components into a rotational mold;
        heating said mixed components in said rotational mold to about 180° C. while rotating said rotational mold to form a film;
        cooling said mixed components in said rotational mold while rotating said rotational mold to a temperature sufficient to solidify said film and form a dialysis membrane; and
        removing the formed dialysis membrane from said chamber.

33. A process for forming a dialysis membrane as claimed in claim 32, wherein said ion exchange resin component is of a first type and said thermoplastic resin component is of a first type and comprising the additional steps of:
    mixing from about 15 percent to about 25 percent by weight of an ion exchange resin component of a second type with from about 85 percent to about 75 percent by weight of a thermoplastic resin component of a second type, wherein said thermoplastic resin component is a hydrophilic polymer selected from the group consisting of polyvinyl alcohol, cellulose acetate, cellulose butyrate, cellulose propionate, and polyethylene-co-vinyl alcohol;
    inserting said second type of mixed components into a plastic bag which bag melts at a temperature above the plastic point temperature of said first type of components;
    inserting said plastic bag into the rotational mold with said first type of components;
    after heating said rotational mold to a temperature of about 180° C., holding said rotational mold at about 180° C. until the components with the ion exchange resin of the first type have melted and coated the mold; and heating said rotational mold to a temperature of about 200° C. to about 210° C. until the plastic bag has melted and the components of the second type have coated the inside of the mold.

34. A process for forming a dialysis membrane comprising the steps of:
   mixing from about 15 percent to about 25 percent by weight ion exchange resin and from about 85 percent to about 75 percent by weight of a thermoplastic resin component wherein said thermoplastic resin component is a hydrophilic polymer selected from the group consisting of polyvinyl alcohol, cellulose acetate, cellulose butyrate, cellulose propionate, and polyethylene-co-vinyl alcohol;
   rotationally forming said mixed components, wherein the rotational forming step comprises the steps of:
      mixing a solvent for said thermoplastic resin and ion exchange resin components with said components to form a polymer solution;
      applying said polymer solution to a rotating mandrel; and
      exposing said polymer solution to a liquid which is a nonsolvent for said thermoplastic resin and said ion exchange resin so as to cause phase inversion in the polymer solution and to form a membrane.

35. A process for forming a dialysis membrane as claimed in claim 34, wherein said ion exchange resin component is of a first type and said thermoplastic resin component is of a first type and the polymer solution is of a first type and comprising the additional steps of:
   mixing from about 15 percent to about 25 percent by weight of an ion exchange resin component of a second type with from about 85 percent to about 75 percent by weight of a thermoplastic resin component of a second type, wherein said thermoplastic resin component of the second type is a hydrophilic polymer selected from the group consisting of polyvinyl alcohol, cellulose acetate, cellulose butyrate, cellulose propionate, and polyethylene-co-vinyl alcohol;
   rotationally forming said mixed components of the second type after rotationally forming said mixed components of the first type; wherein said rotational forming step for components of the second type comprises the steps of:
      mixing a solvent for said thermoplastic resin and ion exchange resin component of the second type with said components to form a polymer solution of a second type;
      applying said polymer solution of the second type to the membrane formed of said components of the first type; and
      exposing said polymer solution to a liquid which is a nonsolvent for said thermoplastic resin and said ion exchange resin so as to cause phase inversion in said polymer solution of the second type and to form a membrane.

* * * * *